United States Patent
Bailey

[15] 3,674,793
[45] July 4, 1972

[54] 6-HYDROXY-2-AZABICYCLO[2.2.2] OCTAN-3-ONES AND 2-AZABICYCLO [2.2.2.]OCTANE-3,6-DIONES

[72] Inventor: Denis M. Bailey, East Breenbush, N.Y.

[73] Assignee: Sterling Drug Inc., New York, N.Y.

[22] Filed: March 29, 1967

[21] Appl. No.: 626,679

[52] U.S. Cl. .................................... 260/293.54, 424/267
[51] Int. Cl. .................................................. C07d 39/00
[58] Field of Search ................ 260/294.3 A, 294.7 B, 293.54

[56] References Cited

OTHER PUBLICATIONS

Huffman, et al., J. Am. Chem. Soc. Vol. 87, No. 10, p. 2,288 (1965).
Huffman and Kamiya, Tet. Let. vol. 1966, No. 17, pp. 1,857–1,860.

Primary Examiner—Henry R. Jiles
Assistant Examiner—G. Thomas Todd
Attorney—Elmer J. Lawson, B. Woodrow Wyatt, Thomas L. Johnson, Robert K. Bair, R. Clifford Bourgeois, William G. Webb and Roger T. Wolfe

[57] ABSTRACT

2-R-6-hydroxy-2-azabicyclo[2.2.2]octan-3-ones (I) and 2-R-2-azabicyclo-[2.2.2]octane-3,6-diones (II) where R is benzyl or lower-alkyl, 6-(lower-alkanoates) of 2-R-6-hydroxy-2-azabicyclo-[2.2.2]octan-3-ones where R is lower-alkyl (III) and preparation of said compounds by reacting a lower-alkyl trans-3,4-epoxycyclohexanecarboxylate with an amine of the formula R—NH$_2$ and heating the resulting lower-alkyl 3-hydroxy-4-RNH-cyclohexanecarboxylate to form I, esterifying I where R is lower-alkyl to form II, and oxidizing I where R is benzyl or lower-alkyl to form III. The compounds have stimulatory activity.

7 Claims, No Drawings

6-HYDROXY-2-AZABICYCLO[2.2.2]OCTAN-3-ONES AND 2-AZABICYCLO [2.2.2.]OCTANE-3,6-DIONES

This invention relates to compositions of matter known in the art of chemistry as 2-azabicyclo[2.2.2.]-octanes and preparation thereof.

The invention sought to be patented, in its composition aspect, resides in the compounds which I designate: 2-R-6-hydroxy-2-azabicyclo[2.2.2]octan-3-one where R is benzyl or lower-alkyl; 6-(lower-alkanoates) of said 2-R-6-hydroxy-2-azabicyclo[2.2.2octan-3-one where R is lower-alkyl; and, 2-R-2-azabicyclo[2.2.2]octane-3,6-dione where R is benzyl or lower-alkyl.

The invention sought to be patented, in its process aspect, resides in the process which comprises reacting lower-alkyl 3,4-epoxycyclohexanecarboxylate with an amine of the formula R—NH$_2$ and heating the resulting lower-alkyl 3-hydroxy-4-RNH-cyclohexanecarboxylate to form 2-R-6-hydroxy-2-azabicyclo-[2.2.2]octan-3-one where R is benzyl or lower-alkyl. The process aspect of the invention also resides in the further step: of reacting said 2-R-6-hydroxy-2-azabicyclo[2.2.2]octan-3-one where R is lower-alkyl with a lower-alkanoylating agent to form its 6-(lower-alkanoate); and, of oxidizing said 2-R-6-hydroxy-2-azabicyclo[2.2.2]octan-3-one to form 2-R-2-azabicyclo[2.2.2]octane-3,6-dione where R is benzyl or lower-alkyl.

Examination of the tangible embodiments of the composition aspect of the invention reveals, upon infrared and nuclear magnetic resonance spectrographic analyses, data confirming the molecular structure assigned to the compounds. These data, taken together with the nature of the starting materials, mode of synthesis and results of elementary analysis, positively confirm the structures of the compositions sought to be patented.

The tangible embodiments of the composition aspect of the invention possess the inherent applied use characteristics of exerting pharmacological effects, for example, psychomotor stimulatory activity, in animal organisms, as evidenced by standard pharmacological evaluation procedures in test animals.

The term "lower-alkyl," as used throughout this specification, means an alkyl radical having from one to six carbon atoms inclusive, illustrated by methyl, ethyl, isopropyl, n-propyl, n-butyl, sec-butyl, isobutyl, n-amyl, n-hexyl, and the like.

The term lower-alkanoyl, as used throughout this specification, means alkanoyl radicals having from one to six carbon atoms which can be arranged as straight or branched chains, among which are, for purposes of illustration but without limiting the generality of the foregoing, formyl, acetyl, propionyl (n-propanoyl), isobutyryl (2-methyl-n-propanoyl) and caproyl (n-hexanoyl).

Without limiting the generality of the foregoing, illustrative and preferred embodiments of my 2-R-6-hydroxy-2-azabicyclo[2.2.2]-octan3-ones are those of formula I:

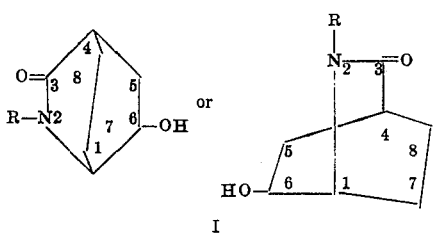

I where R is benzyl or lower-alkyl.

The manner and process of making and using the invention will now be generally described so as to enable a person skilled in the art of medicinal chemistry to make and use the same, as follows:

The intermediate lower-alkyl trans-3,4-epoxycyclohexanecarboxylates, which are generally known compounds, are conveniently prepared by the known procedure of oxidizing a lower-alkyl 3,4-cyclohexenecarboxylate with 3-chloroperbenzoic acid in a suitable solvent, e.g., chloroform, at room temperature, i.e., below 35° C. The ethyl and methyl esters are preferred because of their ready availability.

The reaction of the lower-alkyl trans-3,4-epoxycyclohexanecarboxylate with the amine R—NH$_2$, where R is benzyl or lower-alkyl, is conveniently carried out by heating the reactants in a suitable solvent, e.g., a lower-alkanol, with ethanol being preferred because of its ready availability, at about 75° to 125° C., preferably about 100°–105° C.

The next step in the process is carried out by removing the solvent, e.g., ethanol, of the above reaction mixture and then heating the remaining lower-alkyl 3-hydroxy-4-RNH-cyclohexanecarboxylate, preferably at about 180°–210° C. for about two hours. Higher temperatures up to about 225° C. or higher can be used, with no particular advantage and with the possibility of greater chance for decomposition; lower temperatures down to about 150° C. can be used, with a longer reaction period then being required for completion of the reaction.

The 2-R-6-(lower-alkanoyloxy)-2-azabicyclo-[2.2.2]octan-3-ones are prepared by reacting the corresponding 6-hydroxy compounds with a lower-alkanoylating agent, preferably a lower-alkanoic anhydride or a lower-alkanoyl halide. When a lower-alkanoyl anhydride is used as the acylating agent, the reaction is carried out preferably by heating the anhydride and the 2-R-6-hydroxy-2-azabicyclo[2.2.2]octan-3-one preferably with but optionally without an inert solvent such as benzene, toluene or pyridine. While the reaction was found to proceed rapidly by heating the reactants on a steam bath, other temperatures in the range of about 0° to 150° C., preferably between 30° C. and 100° C., can be used. Alternatively, the acylation can be carried out by reacting a lower-alkanoyl halide with the 6-hydroxy compound preferably at room temperature, i.e., about 20°–25° C., preferably in a dry solvent inert under the conditions of the reaction, e.g., chloroform; alternatively, the reaction with the alkanoyl halide can be carried out using higher temperatures, e.g., 50°–70° C. The 6-formyloxy compounds are prepared by reacting the 6-hydroxy compounds with acetic formic anhydride in formic acid.

The step of oxidizing said 2-R-6-hydroxy-2-azabicyclo[2.2.2]octan-3-one to form the corresponding 3,6-dione is carried out by reacting the former compound with an oxidizing agent effective to oxidize cyclicaliphatic alcohols to cyclic-aliphatic ketones, e.g., chromium trioxide ($CrO_3$). The oxidation is conveniently carried out by mixing the reactants with a suitable solvent, e.g., acetone, water or mixtures thereof, preferably acetone, and gently warming the reaction mixture to about 30°–35° C. whereupon an exothermic reaction takes place. The reaction temperature is controlled by cooling, e.g., by adding small pieces of dry ice.

The best mode contemplated for carrying out the invention will now be set forth as follows:

EXAMPLE 1

2-Benzyl-6-hydroxy-2-azabicyclo[2.2.2]octan-3-one

A solution containing 16.4 g. of benzylamine and 26 g. of ethyl 3,4-epoxycyclohexanecarboxylate (isomeric mixture consisting mainly of the trans isomer) in 200 ml. of ethanol was refluxed for 3 days. The ethanol was removed by distilling in vacuo and the residual material containing ethyl 4-benzylamino-3-hydroxycyclohexanecarboxylate was heated at 200°–205° C. for 2 hours. The reaction mixture was then refluxed in 100 ml. of 5 percent sodium hydroxide in methanol for ten minutes and then poured into brine, i.e., a saturated aqueous solution of sodium chloride. The mixture was extracted with chloroform and the chloroform was removed from the extract by vacuum distillation to yield an oily material which partially crystallized on standing. The partially crystallized material was recrystallized from isopropyl acetate and dried at 50° C. and 20 mm. to yield, as a white crystalline powder, 12.1 g. (33.8 percent yield) of 2-benzyl-6-hydroxy-2- azabicyclo-[2.2.2]octan-3-one, m.p. 82°–83° C. The above mother liquor containing more of the 2-benzyl-6-hydroxy-2-azabicyclo[2.2.2octan-3-one was used below in Example 3.

The above intermediate ethyl 3,4-epoxycyclohexanecarboxylate was prepared as follows: To a solution containing 77 g. of ethyl 3,4-cyclohexenecarboxylate in 500 ml. of chloroform was added dropwise over ninety minutes a solution containing 102 g. of 3-chloroperbenzoic acid in 1,110 ml. of chloroform, keeping the reaction mixture below 35° C. After addition of the chloroperbenzoic acid had been completed, the reaction mixture was stirred for an additional two hours and then allowed to stand overnight. The reaction mixture was then vigorously stirred and to it was added a 10 percent aqueous solution of sodium sulfite until a starch-iodide test was negative (about 25–30 ml. of the sodium sulfite solution was added). The reaction mixture was filtered to remove a precipitated solid and the filtrate was washed with 10 percent aqueous sodium bicarbonate solution, dried over anhydrous sodium sulfate and evaporated in vacuo. The residual oil was distilled under reduced pressure to yield 77.3 g. (91 percent yield) of an isomeric mixture consisting mainly of the trans isomer of ethyl 3,4-epoxycyclohexanecarboxylate, b.p. 55°–56° C. at 0.2 mm., $n_d^{25}$ = 1.4570. Following the above procedure but using 308 g. of methyl 3,4 -cyclohexenecarboxylate and 432 g. of 3-chloroperbenzoic acid, there was obtained 276.4 g. (88.5 percent yield) of an isomeric mixture consisting mainly of the trans isomer of methyl 3,4-epoxy-cyclohexenecarboxylate, b.p. 61°–70° C. at 1.0–1.3 mm.

EXAMPLE 2

6-Hydroxy-2-methyl-2-azabicyclo[2.2.2]-octan-3-one

A mixture containing 10.2 g. of methylamine, 52 g. of methyl 3,4-epoxycyclohexanecarboxylate (isomeric mixture consisting mainly of the trans isomer) and 75 ml. of ethanol was heated at 100°–105° C. for twenty-four hours. Removal of the ethanol under reduced pressure yielded a residue containing methyl 3-hydroxy-4-methyl-aminocyclohexanecarboxylate which was heated under an atmosphere of nitrogen at 185°–195° C. for two hours. The remaining material was distilled in vacuo to yield a fraction distilling at 115°–135° C. at 0.15–0.17 mm. The fraction, which partially crystallized on standing, was recrystallized from isopropyl acetate and dried in vacuo at 60° C. to yield 21.1 g. (45.5 percent yield) of crystalline 6-hydroxy-2-methyl-2-azabicyclo[2.2.2]octan-3-one, m.p. 97.5°–100° C.

EXAMPLE 3

2-Benzyl-2-azabicyclo[2.2.2]octane-3,6-dione

The mother liquor from Example 1 was evaporated in vacuo to yield a residue containing 2-benzyl-6-hydroxy-2-azabicyclo[2.2.2]octan-3-one. The latter was taken up in acetone, the acetone solution cooled to about 0° C., and a slight excess of Jones' reagent (26.7 g. of chromium trioxide in 23 ml. of concentrated sulfuric acid diluted to 100 ml. with water) was added. When no reaction took place at 0° C., the mixture was warmed gently to about 30°–35° C. whereupon an exothermic reaction proceeded. Small pieces of dry ice were added directly to the reaction mixture to keep the reaction temperature in the range of about 30° to 40° C. After the reaction had subsided, the mixture was poured into water and the resulting aqueous mixture extracted with chloroform. The chloroform extract was washed with sodium bicarbonate, dried over anhydrous sodium sulfate and evaporated in vacuo to yield a thick oily material which crystallized on standing. The crystalline material was recrystallized twice from isopropyl alcohol to yield 1.6 g. of 2-benzyl-2-azabicyclo[2.2.2]octane-3,6-dione, m.p. 95.5°–97° C.

EXAMPLE 4

2-Methyl-6-n-propanoyloxy-2-azabicyclo[2.2.2]-octan-3-one

A mixture containing 2.0 g. of 6-hydroxy-2-methyl-2-azabicyclo[2.2.2]-octan-3-one, 10 ml. of pyridine and 2 ml. of n-propanoic anhydride was stirred at room temperature for about sixteen hours and then distilled in vacuo to remove the pyridine and excess propanoic anhydride. The resulting oily residue was distilled under reduced pressure to yield a 1.9 g. (70 percent yield) fraction of 2-methyl-6-n-propanoyloxy-2-azabicyclo[2.2.2-octan-3-one distilling at 103°–105° C. at 0.08 mm.

The foregoing description of the invention is for purposes of illustration and does not limit the generality of the applicability of the inventive concept as herein set forth. Other 2-R-6-hydroxy-2-azabicyclo-[2.2.2]octan-3-ones, 2-R-2-azabicyclo[2.2.2]octane-3,6-diones and 6-(lower-alkanoyloxy)-2-R-2-azabicyclo[2.2.2-octan-3-ones can be prepared in the manner above-described by substituting in the procedure of Example 2 molar equivalent quantities of the desired lower-alkylamine and a lower-alkyl trans-3,4-epoxycyclohexanecarboxylate to form the corresponding lower-alkyl 3-hydroxy-4(lower-alkylamino)cyclohexanecarboxylate, and heating the latter to form the corresponding 6-hydroxy-2-(lower-alkyl)-2-azabicyclo[2.2.2octan-3-one. Further illustrative compounds thus prepared are: 2-ethyl-6-hydroxy-2-azabicyclo[2.2.2]octan-3-one (using ethylamine), 6-hydroxy-2-n-propyl-2-azabicyclo[2.2.2octan-3-one (using n-propylamine), 6-hydroxy-2-isobutyl-2-azabicyclo[2.2.2]-octan-3-one (using isobutylamine), and 2-n-hexyl-6-hydroxy-2-azabicyclo[2.2.2]octan-3-one (using n-hexylamine). Following the procedure described in Example 3, these 6-hydroxy compounds are oxidized to the corresponding 3,6-diones, namely, 2-ethyl-2-azabicyclo-[2.2.2]octane-3,6-dione, 2-n-propyl-2-azabicyclo[2.2.2]octane-3,6-dione, 2-isobutyl-2-azabicyclo[2.2.2]octane-3,6-dione, and 2-n-hexyl-2-azabicyclo[2.2.2]octane-3,6-dione. Following the procedure described in Example 4 using molar equivalent quantities of the appropriate 6-hydroxy-2-(lower-alkyl)-2-azabicyclo[2.2.2]octan-3-one and alkanoic anhydride (or alkanoyl halide), the following 6-(lower-alkanoyloxy) compounds are prepared: 6-acetoxy-2-methyl-2-azabicyclo[2.2.2octan-3-one (using acetic anhydride), 2-ethyl-6-n-propanoyloxy-2azabicyclo[2.2.2]-octan-3-one (using n-propanoyl chloride), 6-n-hexanol-oxy-2-methyl-2-azabicyclo[2.2.2]octan-3-one (using n-hexanoyl chloride), 6-n-propanoyloxy-2-n-propyl-2-azabicyclo[2.2.2]octan-3-one (using n-propanoic anhydride), 6-acetoxy-2-isobutyl-2-azabicyclo[2.2.2]octan-3-one (using acetyl chloride), 2-n-hexyl-6-n-propanoyloxy-2-azabicyclo[2.2.2]octan-3-one (using n-propanoic anhydride), and, 6-formyloxy-2-methyl-2-azabicyclo[2.2.2]octan-3-one (using acetic formic anhydride and formic acid in place of pyridine as the solvent).

The tangible embodiments of the composition aspect of the invention when tested according to standard pharmacological evaluation procedures have been found to possess the inherent applied use characteristics of exerting pharmacological effects in animal organisms. For example, when administered orally to mice using a modified procedure of the photocell activity cage method of Dews [Brit. J. Pharmacol. 8, 46 (1953)], the compounds were found to have psychomotor stimulatory properties.

The subject matter which the applicant regards as his invention is particularly pointed out and distinctly claimed as follows:

1. 2-R-6-hydroxy-2-azabicyclo[2.2.2]octan-3-one where R is benzyl or lower-alkyl.

2. A 6-(lower-alkanoate) of the compound according to claim 1 where R is lower-alkyl.

3. A 6-propionate of the compound according to claim 1 where R is methyl.

4. 6-Hydroxy-2-methyl-2-azabicyclo[2.2.2]octan-3-one according to claim 1 where R is methyl.

5. 2-Benzyl-6-hydroxy-2-azabicyclo[2.2.2]-octan-3-one according to claim 1 where R is benzyl.

6. 2-R-2-azabicyclo[2.2.2]octane-3,6-dione where R is benzyl or lower-alkyl.

7. 2-Benzyl-2-azabicyclo[2.2.2]octane-3,6-dione according to claim 6 where R is benzyl.

* * * * *